(12) United States Patent
Chelchowski et al.

(10) Patent No.: US 7,270,351 B2
(45) Date of Patent: *Sep. 18, 2007

(54) PIPE COUPLING

(76) Inventors: David Chelchowski, 79 Jetty Road, Largs Bay, South Australia 5016 (AU); Geoffrey B. Puckett, 27 Slade Cresent, Hallett Cove, South Australia 5158 (AU); Luke Raymond, 41 William Street, Clarence Park, South Australia 5158 (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/177,764

(22) Filed: Jul. 7, 2005

(65) Prior Publication Data

US 2005/0285391 A1    Dec. 29, 2005

Related U.S. Application Data

(63) Continuation of application No. 10/346,921, filed on Jan. 17, 2003, now Pat. No. 6,974,162.

(51) Int. Cl.
*F16L 35/00* (2006.01)

(52) U.S. Cl. ............ 285/382.7; 285/322; 285/331; 285/342; 285/249

(58) Field of Classification Search ........... 285/382.7, 285/322, 331, 342, 249, 255
See application file for complete search history.

(56) References Cited

U.S. PATENT DOCUMENTS 3,195,933 A * 7/1965 Jacobs ................ 285/247
4,431,216 A * 2/1984 Legris ................ 285/104
5,466,019 A * 11/1995 Komolrochanaporn ...... 285/343
5,673,945 A * 10/1997 Olson ................ 285/322
6,974,162 B2 * 12/2005 Chelchowski et al. ... 285/382.7

* cited by examiner

*Primary Examiner*—David Bochna
(74) *Attorney, Agent, or Firm*—Francis Law Group

(57) ABSTRACT

A coupling assembly for plastic pipes including a nut, a body, a grip-ring, and a seal. The nut can engage the body through appropriate threads and includes a hooked projection having a sloping surface adapted to abut against and provide a force on a corresponding surface of the grip ring within the body. A pipe is inserted through the nut, grip-ring, and seal into the body. Tightening of the nut causes its sloped surface to engage and the grip ring to be forced both radially and longitudinally. Radial compression results in the grip-ring engaging the pipe whilst longitudinal forcing causes it to be forced into the body simultaneously abutting against and compressing the seal whilst dragging the pipe further into the body. The nut and the body may further have tapered surfaces that are brought together as the grip-ring is forced into the body. The physical connection between the body and the nut provides reinforcing for the nut, a feature especially useful when dealing with soft plastics. Further features include a lip on the grip-ring that provides an additional support for the grip-ring when compressed as well as an abutment shoulder on the nut preventing the grip-ring form being pulled out of the body.

5 Claims, 6 Drawing Sheets

PIPE COUPLING

CROSS REFERENCE TO RELATED APPLICATIONS

This application is a continuation of U.S. application Ser. No. 10/346,921, filed Jan. 17, 2003 now U.S. Pat. No. 6,974,162, which claims priority based on 35 U.S.C. 365(c) from PCT/AU02/00487 filed Apr. 19, 2002.

This invention relates to a coupling of the type having a nut and a grip-ring that is suitable for engaging the outer surface of a polymeric pipe and is of the type where the pipe may be inserted into an already assembled coupling.

BACKGROUND OF THE INVENTION

Couplings adapted for engagement with the outer surface of a polymeric pipe are well known. The couplings generally include a sub-assembly of a compression sleeve, a resilient gasket ring permanently attached to the inner end of the compression sleeve, a gripping member, and a nut. The gasket ring encounters an abutment in a socket in the body as the nut is tightened, and further tightening of the nut radially compresses the gripping member so that its inwardly directed barbed projections engage the outer surface of a pipe to which the coupling is attached. The end of the pipe is freely insertable through the gripping member and sleeve and into the socket in the body. There are also provided abutment surfaces within the body coupling and the nut that abut inner and outer surfaces of a flange outstanding from the outer end of the compression sleeve.

These couplings have proven to be very successful, both technically and commercially and have achieved great success.

A practical problem that is frequently encountered with such couplings is that the coupling is too long for particular applications, such as homes and meter boxes. However, the nature of plastic couplings is such that common knowledge assumes that they require length to provide for the strength needed.

Thus, in applications where size is important metal fittings have been used whose strength properties allows them to be much shorter. These are however significantly more expensive than moulded plastic couplings.

It is therefore an object of the present invention to provide for a pipe coupling that overcomes at least some of the abovementioned problems or provides the public with a useful alternative, by providing a plastic coupling that is significantly shorter than hitherto known. This results in significant cost savings in that less plastic raw material is needed. Other advantages of shorter plastic couplings relate to issues of stocking, warehousing, transportation, and weight.

BRIEF SUMMARY OF THE INVENTION

According to the invention there is provided a coupling for connection of a polymeric pipe, said 5 coupling including;

a hollow body having an external thread extending at least in part therealong and having an inner surface;

a nut threadably engaging said body external threads, said nut having at one end an internal thread co-operable with said body external thread and including a hooked projection adapted to extend over at least part of said body inner surface said projection including a first inner surface generally parallel to said body inner surface, a second outwardly converging surface extending from the inner edge of said inner surface;

a deformable gripping member having a first surface generally parallel to said body inner surface and having a second outwardly converging outer surface extending form said first surface, said member including radially inward barbs;

wherein upon tightening of said nut, said nut second surface abuts against and exerts a force on said gripping members second surface both in the longitudinal and radial directions to thereby cause the grip ring to be urged both radially and longitudinally into the body, said nut first surface sliding alongside said body first surface.

Preferably, the grip-ring has moved sufficiently radially inwardly it has engaged the pipe to thereby drag it into the body and upon further tightening of the nut, said grip-ring second surface is caused to slide inwardly against the nut second surface.

Preferably, the body inner surface is tapered and diverges outwardly of the body so that upon tightening of said nut as the grip-ring moves into said body a percentage of the nut first surface abuts against the body inner surface wherein said body thus reinforces said nut against any radial force.

Similarly, the nut first surface may be tapered and converge inwardly so that upon tightening of said nut as the grip-ring moves into said body a percentage of the nut first surface abuts against the body inner surface wherein said body thus reinforces said nut against any radial force.

Preferably, the body inner surface is tapered and diverges outwardly of the body, and the nut first surface is tapered and converges inwardly wherein upon tightening of said nut the two surfaces abut against each other until in a fixed position at which time the body reinforces the nut against any radial force. It is convenient if the taper on the body and the nut is of the same order, and more preferably still the taper may be of the order of several degrees.

The body may include an end adapted to engageably slide into the cavity defined by the nut body and the hooked projection.

Preferably, the grip-ring includes an outer annular lip extending rearwardly from said second surface, said grip-ring adapted to abut against said body when the nut is in a non-tightened position wherein as the nut is being tightened it is compressed causing the lip to enter into said body, the outer edge of said lip abutting against the body inner surface to provide support therefore.

Preferably, the slope of the grip-ring second surface is smaller than the slope of the nut second surface and is selected so that when the nut engages the grip-ring and forces it into the body thereby compressing it, the slope of the grip-ring second surface is generally the same as the nut second surface. More preferably still, the slope of the grip-ring second surface in its rest state is some 37 degrees, the slope of the nut second surface some 45 degrees.

The nut may further include an annular shoulder extending radially inwardly from the edge of said nut second surface, said stop adapted to be abutted by said grip-ring when in its compressed state to thereby provide a resistive force for the grip-ring moving longitudinally out of the body.

Preferably, the width of said nut second surface is greater than the width of the grip-ring second surface to thereby accommodate said grip-ring second surface sliding alongside said nut second surface as the nut is tightened whilst full surface contact between the two surfaces is maintained.

More preferably still, the width of said nut second surface is some ⅓ greater than the width of the grip-ring second surface.

A coupling of the invention may conveniently be constructed from acetic plastics material or polypropylene material.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFFERED EMBODIMENT

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Figure 1:
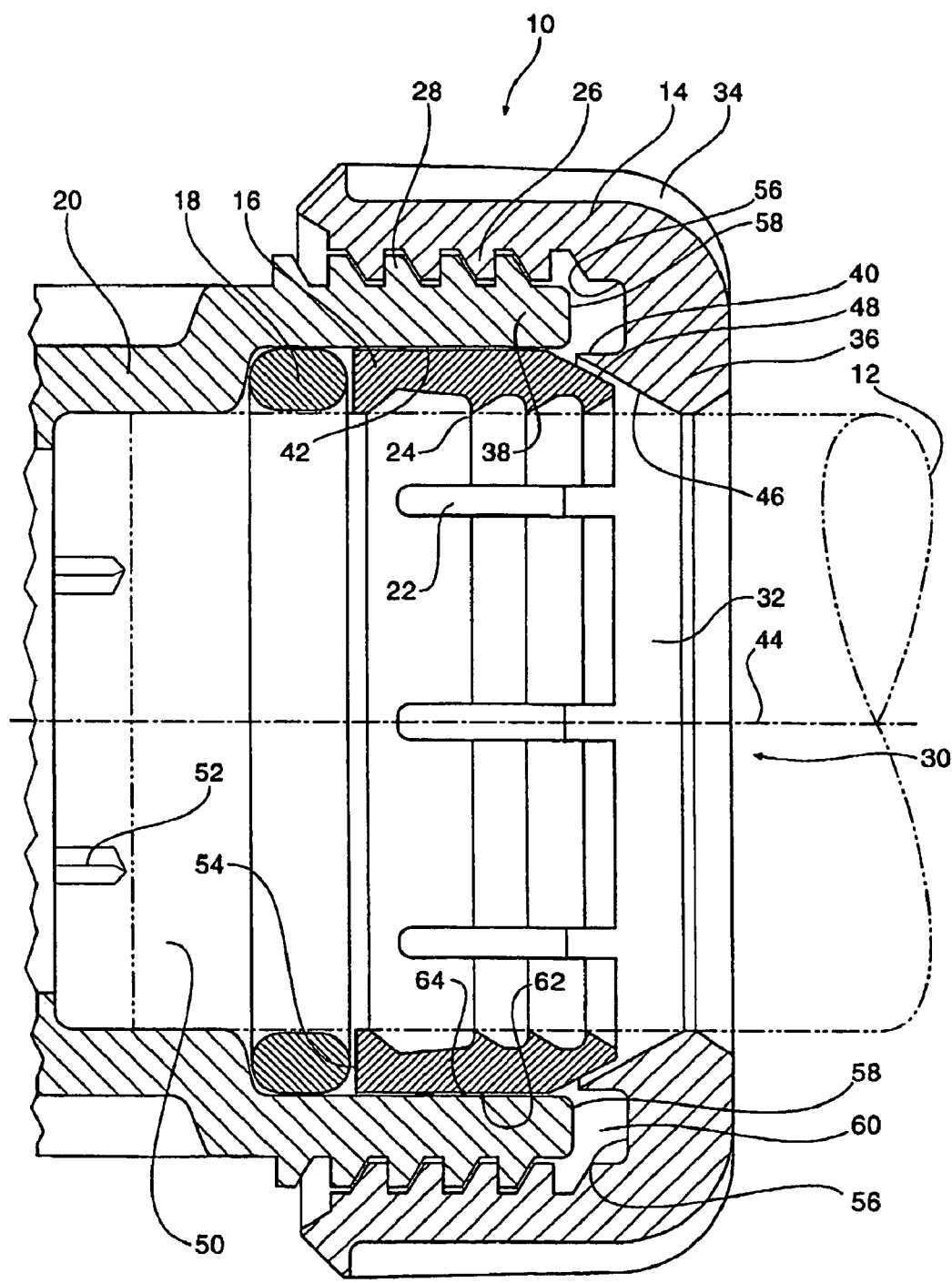
FIG. 1 is a cross-sectional drawing of a first embodiment of a coupling embodying the present invention including a nut having a wedge configuration.

Shown in FIG. 1 is a coupling 10 with a pipe 12 to be inserted into the coupling. The coupling includes a nut 14, a gripping member or grip-ring 16, seal 18 and a body 20. The grip-ring includes splits 22 since it must be radially and thereby circumferentially deformable, and is typically a split ring or collet for ease of manufacture. The grip-ring further includes radially inwardly and axially spaced barb projections 24. The splits enable the grip ring to be radially compressed so that the barbs 24 engage the pipe 12.

The nut includes female threads 26 that engage corresponding male threads 28 on the body 20. In use, pipe 12 is inserted though the aperture 30 of the nut and through the bore 32 of the grip-ring. To aid in rotating the nut, projections 34 to assist with hand or tool grip are arranged circumferentially on the nut.

The nut includes a hooked projection 36 extending around end 38 of the body 20 and having an inner surface 40 parallel to inner surface 42 of the body 20, both surfaces generally parallel to the longitudinal axis 44 of both the coupling and the pipe. The surfaces are adjacent each other so that as the nut is tightened the nut inner surface 40 slides alongside the body inner surface.

The hooked projection further includes an inwardly diverging surface 46 whose surface has a shape and slope correspondingly matching the outwardly converging tapered surface 48 on the grip-ring 16. As the nut 14 is tightened the nut surface 46 abuts and bears against the grip-ring surface 48. Since both the nut and the grip-ring surfaces are at an angle to the longitudinal axis 44 of the coupling, the grip-ring will experience both a radial and a longitudinal force.

In use, the pipe 12 is inserted into the bore 50 of the body 20 through the aperture 30 of the nut, bore of the grip-ring 32 and through the seal 18, until it abuts against projections 52. With the nut in the unscrewed position, the barbs 24 have not engaged the pipe 12, and the surfaces 46 and 48 of the nut and the grip-ring respectively are apart.

Initial tightening of the nut 14 on the body 20 will cause abutment of the nut surface 46 against the corresponding surface 48 of the grip-ring. Since the two surfaces are at an angle to the longitudinal direction 44, the grip-ring 16 experiences both a radial and a longitudinal force. The radial force compresses the grip-ring and causes the barbs 24 to bite into and engage the pipe 12, thereby dragging it into the body 20 and over the projections 52.

Simultaneously, the grip-ring rear surface 54 abuts and begins to compress seal 18 to provide a seal for the pipe 12. As one further tightens the nut, the nut stop surface 56 approaches the body stop surface 58 and the space 60 in between the two is progressively reduced as the nut is tightened.

Further tightening of the nut compresses the sealing or 0-ring 18, and causes the surface 48 of the split-ring to be radially compressed even further so that its outer surface 62 moves away from the inner surface 64 of the body 20, that is, it bends inwards. The nut can then travel further until either the nut stop surface 56 and the body stop surface 58 abut, eliminating space 60 or the grip ring resists any further radial and longitudinal motion. This now indicates to the user that an effective seal has been effected.

Those skilled in the art will appreciate that the configuration of the nut as described above provides for a working surface that by exerting a force on the grip-ring causes both a seal of the coupling to a pipe as well as a holding force resisting the pipe from disengaging from the coupling. Contrary to common belief that such a nut will not be strong enough we have found that a configuration as described above made from moulded or extruded plastics does possess sufficient strength to lock the pipe to the coupling without requiring a longer nut structure.

However, in those instances where the plastic material that is used is very soft, such as polypropylene, it may be necessary to provide for reinforcing of the nut by slightly altering the configuration and interaction of the nut and the body. This is illustrated in FIGS. 2-5, where the nut is configured to receive additional support through the coupling body.

In this embodiment, the nut also includes a hooked projection 36 having an inwardly diverging surface 46 whose surface has a shape and slope correspondingly matching the outwardly converging tapered surface 48 on the grip-ring.

However, in contrast to the configuration of the first embodiment the nut inner surface 66 is at least partially tapered, typically at an angle of a few degrees, and is designed to match the taper on the body surface 68. When the nut is tightened and the surfaces 56 and 58 abut or are at least close to each other, the tapers on the surfaces 66 and 68 also abut and are effectively locked together. This has the combined effect of reinforcing that section of the nut since any outward radial forces experienced by the nut are also transferred to the body. The nut is effectively "tied" to the body and together they form a more rigid assembly. This assembly provides several advantages.

One should appreciate that it may not be necessary for both the body and the nut surfaces to be tapered, and only one need be so. The key is that there is a taper so that as the grip-ring moves into the body the two surfaces are caused to approach each other. Whether it is therefore the body or the nut that is tapered is not critical. The best configuration would of course be both tapered. In plastics there are however tolerances and it is unlikely that both would have the same taper anyway.

Firstly, any tensile force that is applied to the pipe is in part transferred as a radial force into the body through the nut thereby providing reinforcement. This type of load sharing between the nut and the body allows the nut to be smaller than if the reinforcing was not present. Otherwise the nut construction would have to be bulkier and/or longer to accommodate for a tensile load. A smaller nut that does not have this reinforcing may in fact allow the grip or split ring with pipe attached to be completely pulled out of the coupling under a tensile load.

Secondly, the reinforcing also assists in resisting bending forces that may be applied by the pipe to the coupling. The interlocking between the nut and the body prevents the nut from moving on the body and thus ensures a seal is maintained.

Figure 2:
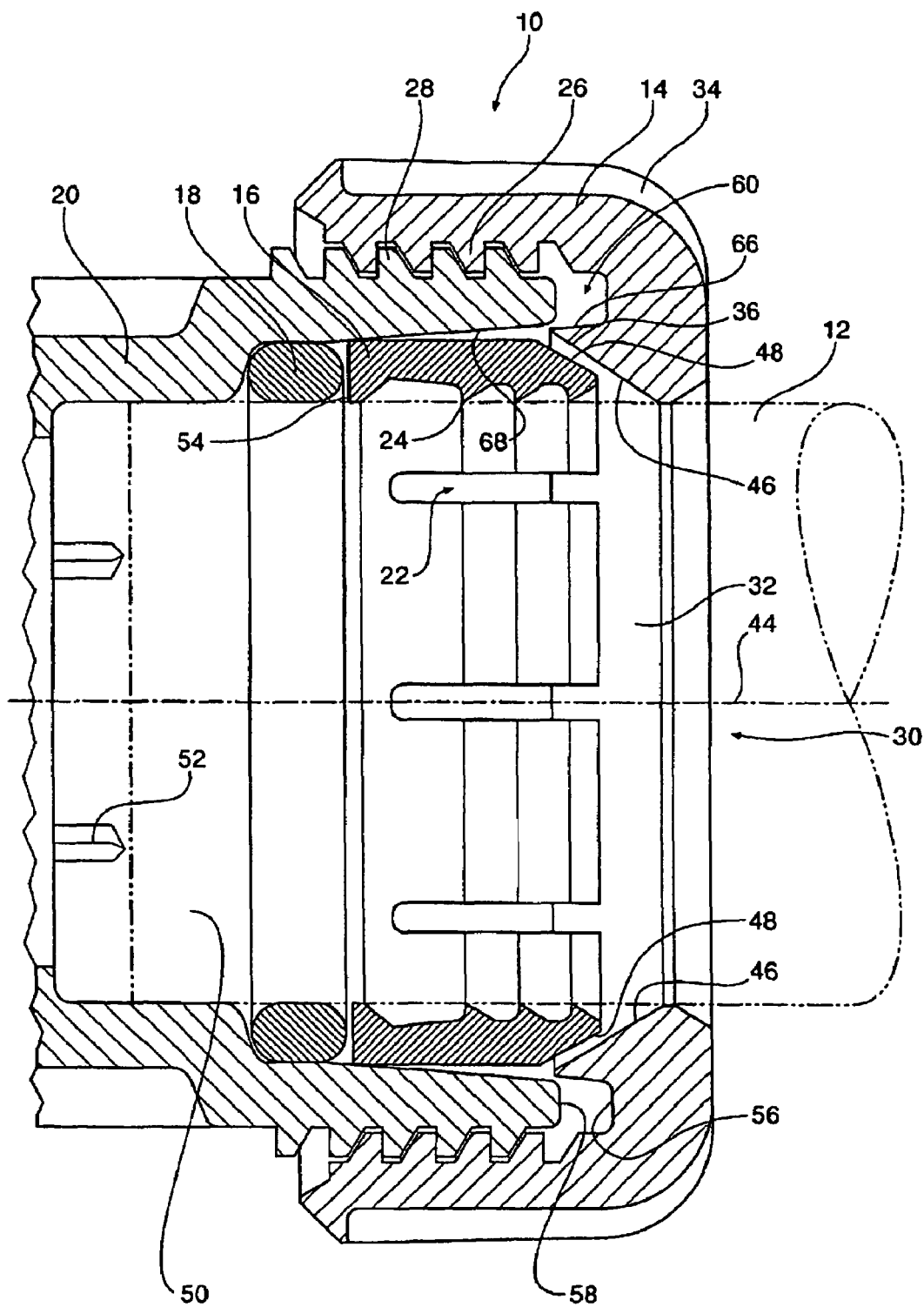
FIG. 2 is a cross-sectional drawing of a second embodiment of a coupling embodying the present invention having a nut including a wedge configuration that can interact with the coupling body.
Figure 3:
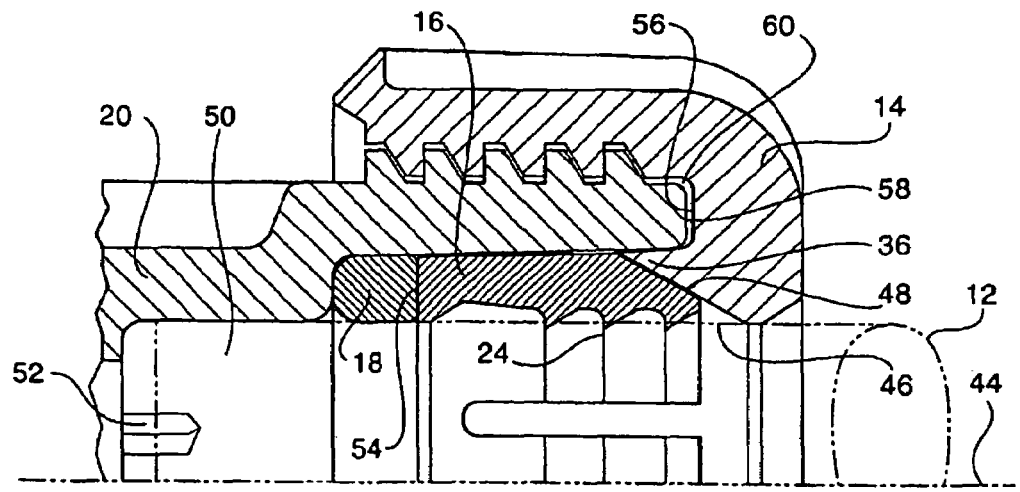
FIG. 3 is a partial cross-sectional drawing of the coupling of FIG. 2 when the nut has been partially tightened.
Figure 4:
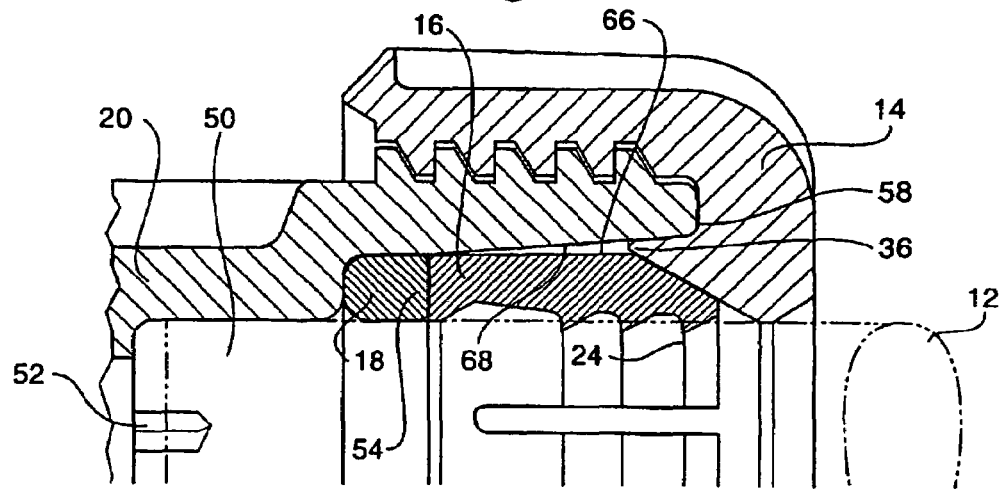
FIG. 4 is a partial cross-sectional drawing of the coupling of FIG. 2 when the nut has been completely tightened.
Figure 5:
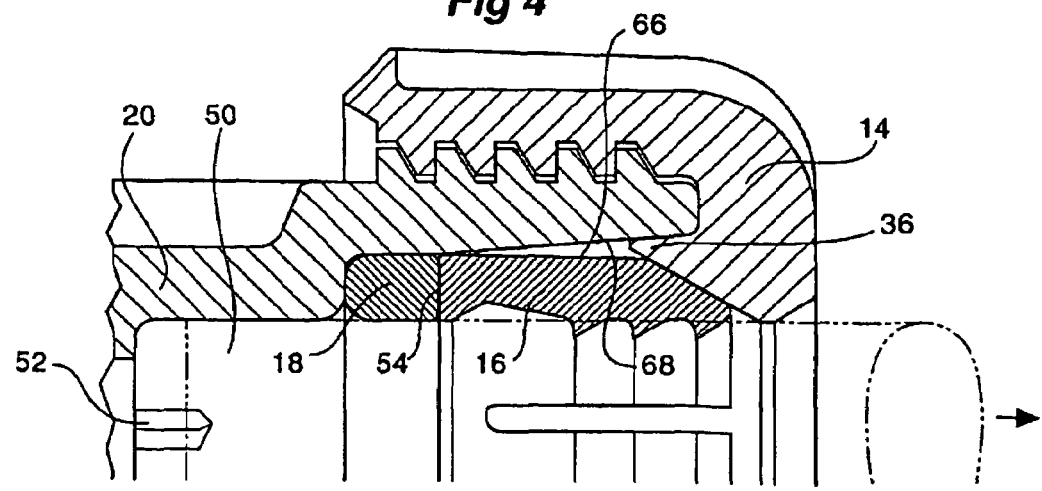
FIG. 5 is a partial cross-sectional drawing of the coupling of FIG. 2 when it has been completely tightened and when the pipe has experienced a tensile longitudinal force.

In the unscrewed position as shown in FIG. 2 it may be preferable but not essential that at least a part of the nut projection extends into the body end 38. This assists in ensuring that upon tightening of the nut, the nut projection glides smoothly into the body rather than being caught at the end of the body. The operation of the nut according to this embodiment is illustrated in FIGS. 3-5. Initial tightening of the nut 14 on the body 20 causes abutment of the nut surface 46 against the corresponding surface 48 of the grip-ring. Since the two surfaces are at an angle to the longitudinal direction of travel 44 of the nut, the grip-ring 16 experiences both a radial and a longitudinal force. The radial force compresses the grip-ring and causes the barbs 24 to bite into and engage the pipe 12, thereby dragging it into the body 20 and over the projections 52.

Simultaneously, the grip-ring rear surface 54 abuts and begins to compress seal 18 to provide a seal for the pipe 12, this shown in FIG. 3. As one further tightens the nut onto the body, and as shown in FIG. 4, the inner nut surface 56 approaches the body positive stop surface 58. In this position the nut travels so that the space 60 between the two stops is progressively reduced.

As the nut is tightened even further, as shown in FIG. 4, the sealing or O-ring 18 is further compressed, and the movement of the nut also causes the surface 48 of the split-ring to be radially compressed even further so that its outer surface 66 moves away from the inner surface 68 of the body 20. As already discussed the nut can then travel further until either the nut stop surface 56 and the body stop surface 58 abut, eliminating space 60 or the grip ring resists any further radial and longitudinal motion.

As illustrated in FIG. 5, the present configuration also assists in securing a pipe to the coupling when a tensile load is applied. As a load is experienced by the pipe causing it to experience a force in the longitudinal direction 44 out of the body, the configuration of the surface 46 and 48 on the nut and grip-ring respectively results in the grip-ring 16 further being compressed as it is pulled outwardly from the body. One potential difficulty with this type of arrangement is that the compression on the seal is reduced. For that reason it is important that care be paid to the relative slope of the surfaces on the nut and the grip-ring. On the one hand one wishes to have a slope so that tightening or screwing of the nut results in the compression of the grip-ring to engage the pipe. On the other hand one has to ensure that the angle is not so great that a longitudinal force on the pipe will allow for excessive movement of the grip-ring outwardly of the body.

The angle of the slopes of the surfaces 46 and 48 may be set generally at an angle of 45 degrees. However, the angle may be modified so that different ratios of forces on the grip ring can be chosen. For example, if the angle of the slope in relation to the longitudinal axis of the coupling is 30 degrees then the ratio of the longitudinal to the radial forces experienced by the grip ring is no longer 1:1 but will be related to the sine of the angle. Changing this angle then allows one to control the relative forces experienced in the two directions.

One can now appreciate that as the nut is tightened the two wedge like surfaces meet on top of each other. However, as the nut is tightened further, the grip-ring experiences a radial force causing the front surface 48 of the grip-ring to be also pushed downwards resulting in the relative angle of the nut surface 46 and grip-ring surface 48 to change. Since it is more critical that a tightened nut possess the relative strength, it is desirable that the surfaces 46 and 48 are relatively parallel and flat on top of each other when the nut has been tightened rather than at the initial engagement. For that reason, the initial slope of grip-ring surface 48 is shallower than that of the nut, that is, closer to the longitudinal axis of the coupling 44.

Figure 6:
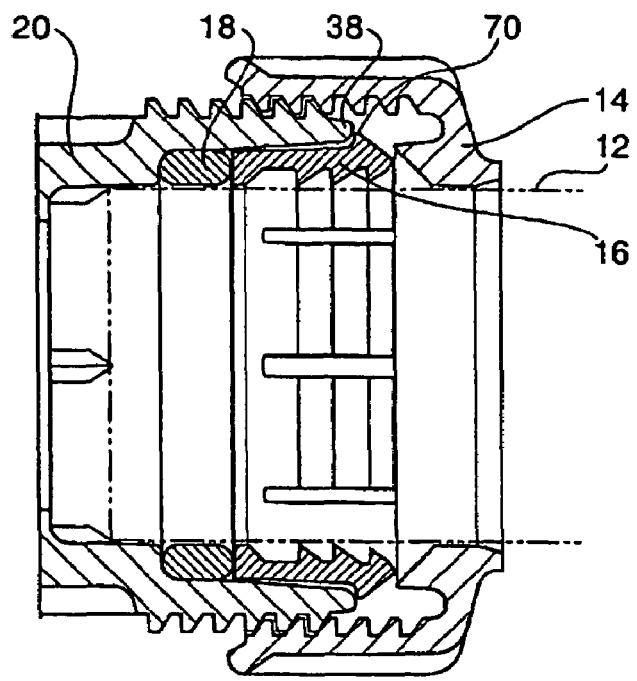
FIG. 6 is a cross-sectional drawing of a third embodiment of the coupling embodying the present invention and illustrating a modified grip-ring, before the coupling nut has been tightened.
Figure 7:
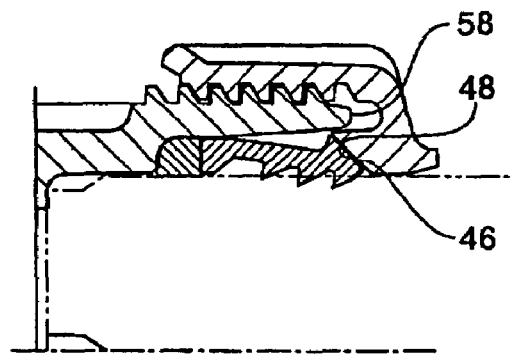
FIG. 7 is a cross-sectional drawing of the coupling of FIG. 6 when the nut has been tightened to an operating position.
Figure 8:
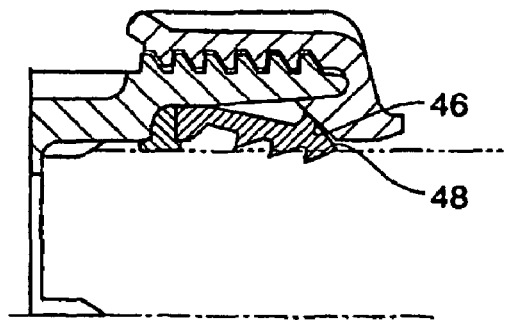
FIG. 8 is a cross-sectional drawing of the coupling of FIG. 6 when the nut has been fully tightened.

Illustrated in FIGS. 6-8 is a further advantageous embodiment of the present invention. This overcomes potential operating difficulties in the coupling illustrated in FIGS. 2-5. In that coupling, when the nut has been fully tightened the front end of the grip-ring has been radially compressed, and the only contact between the grip-ring and the inner surface 68 of the body occurs at the other end of the grip-ring that is closer to the sealing ring 18. It should be apparent to those skilled in the art that when such a coupling has been assembled with a pipe, lateral forces exerted on the pipe may move the grip-ring front end across the surface 46 of the nut, much like that seen in ball-joint arrangements. In some instance it therefore may be advantageous to reinforce the grip ring by providing an extra support point along its length that engages the body when the nut is in a tightened position. This is illustrated in FIGS. 6-8, where the grip ring now includes a lip 70, the lip being an extension of the grip-ring surface 48. The lip is initially of a greater diameter than the inner diameter of the body at end 38 in that it sits flush against part of the body stop 58 when in an uncompressed state. When the nut is being tightened the grip-ring front end then slips into the body under the longitudinal and radial forces exerted by the nut. Although not shown, it should be understood that the angle between the lip and the grip-ring is of an arcuate shape rather than being a right angle and that assists in the grip-ring slipping into the body and over the body end 38.

As the grip-ring slides into the body, the edge of the lip 70 abuts the inner body surface so that the grip-ring engages the body both at the front and its rear ends thus ensuring that it resists rotation with respect to the body, that is, its longitudinal axis remains generally co-axial with the rest of the coupling even when a lateral force is applied to the pipe and the grip-ring.

The lip on the grip-ring also provides the additional advantage in assembly of the coupling. When the grip-ring is being inserted into the body, use of the lip ensures that it is inserted in the right orientation.

FIGS. 6-9 also illustrate the advantage of having the initial slope of the grip-ring surface 48 being shallower than that of the nut surface 46 as discussed above. As shown, as the nut is tightened and the front end of the grip-ring is radially compressed, the relative slope between these two surfaces changes so that when in the normal operating position, the two surfaces are generally parallel.

One can appreciate that the above configuration enables the coupling to be of a smaller length than hitherto known by conventional couplings. In the free or unscrewed state, it is preferable that the extreme projection of the nut wedge is located within the body. It is to be understood though that this projection is not a sharp one but would be somewhat rounded to ensure that it is not a sharp annular projection.

The dimension of the surface 46 of the nut is also of a greater dimension than the surface 48 of the grip-ring. This allows the surface of the grip-ring to totally abut against the surface of the nut even when it has moved along the nut surface (comparing FIGS. 2 and 5) to allow for their relative sliding motion.

Figure 9:
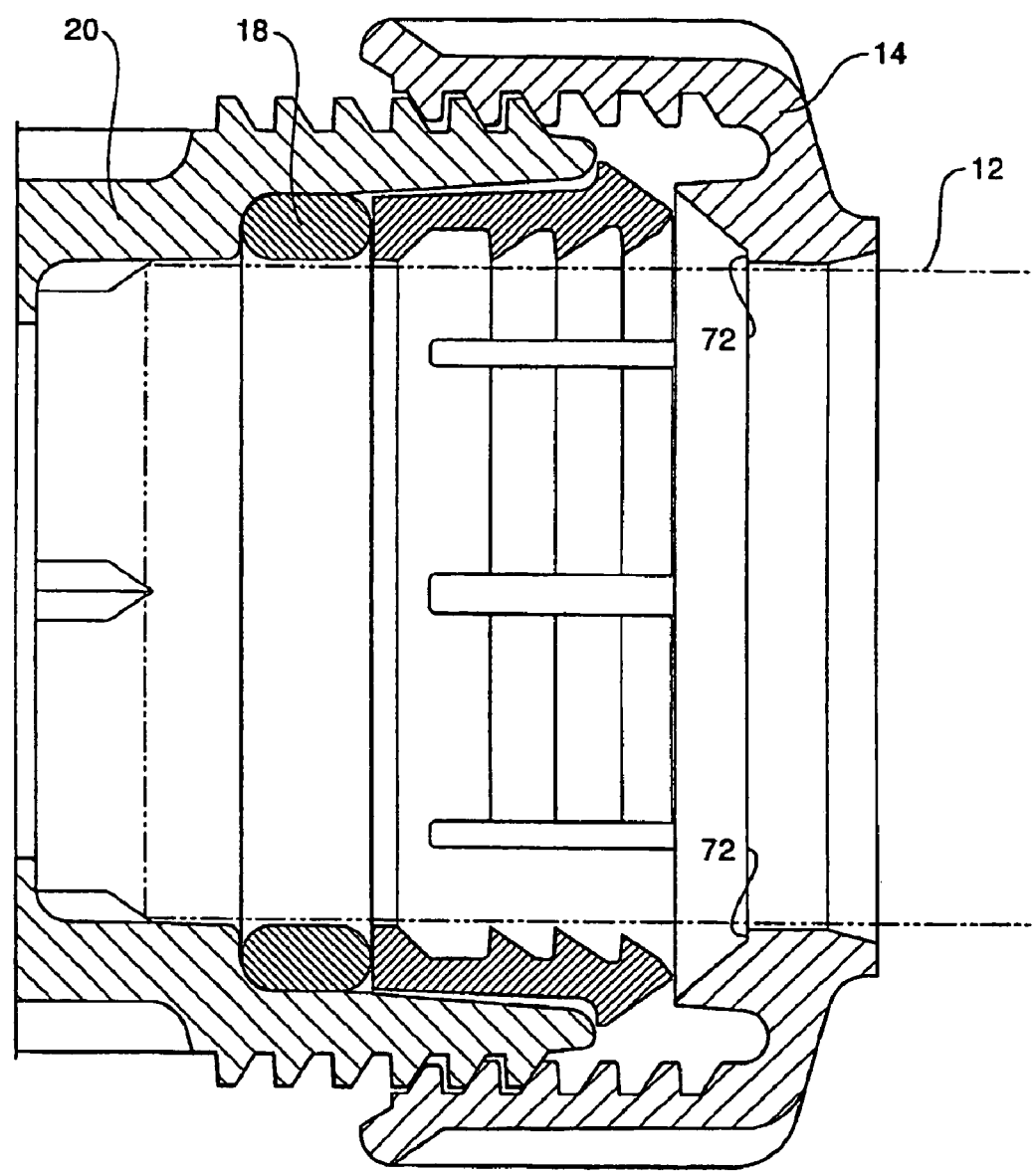
FIG. 9 is a cross-sectional drawing of a coupling according to a further embodiment of the present invention and including a nut having a locking lip.

To further assist in securing the pipe within the body of the coupling the nut may include a stop or lip that prevents the grip-ring from being pulled out of the body when the coupling is in the tightened state. This is illustrated in FIG. 9 where extending inwardly from the wedge surface an annular shoulder or lip 72 that is generally perpendicular to the longitudinal axis of the coupling. As would be appreciate by the skilled addressee, this has the effect of preventing the grip-ring from being pulled out of the coupling since it will directly abut against the lip and will not allow the grip-ring to move further outward.

Figure 10:
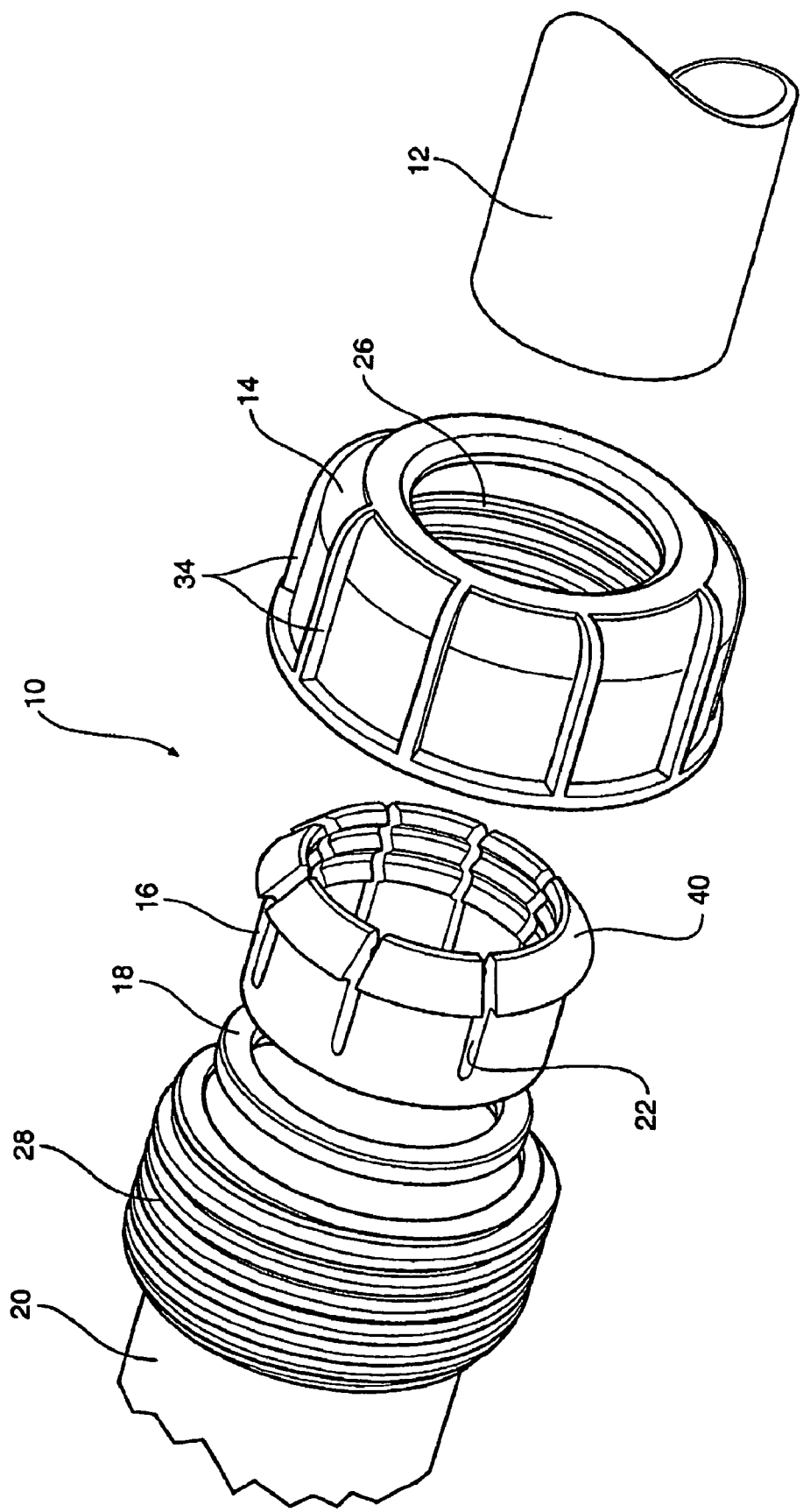
FIG. 10 is a perspective view of a coupling including features of all of the embodiments of the previous Figures.

A coupling including all of the above features is illustrated in FIG. 10. The skilled person in the art will now appreciate the advances provided by all of the features discussed above and as summarised here:

The use of the wedge nut surface on a hooked projection reduces the amount of raw material needed and provides for a shorter coupling that can therefore be used in hitherto inappropriate locations.

The use of tapered surfaces between the nut and/or the inner body assists in transmitting any radial forces through the nut and into the body thereby providing additional support that may be required, for example, when the material used is not rigid enough for the particular size of coupling or there are issues of operating conditions including those related to operational temperatures and pressures.

The use of a lip on the grip-ring that assists in assembly of the coupling and provides an additional support between the grip-ring and the body reducing the ability of the grip ring and hence the pipe to move off-axially with respect to the rest of the coupling.

The configuration of the wedge surface and the grip-ring surface being such that they surfaces are initially not parallel but as the nut is being tightened and the grip-ring is bent inwardly the two surfaces end up generally parallel to provide a much better fit.

The use of a shoulder or lip on the nut that provides a stop for the grip-ring assisting in preventing the grip-ring and hence the pipe form being pulled out of the coupling.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

What is claimed is:

1. A coupling for connection of a polymeric pipe, comprising:
    a hollow body having external threads and an inner surface, said body including an extended end portion having an end portion surface, said body comprising a polymeric material;
    a nut adapted to threadably engage said body external threads, said nut comprising a polymeric material, said nut having an internal cavity and at one end and internal threads co-operable with said body external threads, said nut including an integral hooked projection that extends from a nut transition region and over at least part of said body inner surface, said projection including a first inner surface generally parallel to said body inner surface and a second outwardly converging surface extending from the inner edge of said inner surface, said projection second surface having a first taper angle, said nut further including a recessed stop region that is disposed proximate said projection and configured to receive said body end portion therein, said recessed stop region having a recessed stop surface; and
    a deformable grip-ring having a first surface generally parallel to said body inner surface and having a second outwardly converging outer surface extending from said first surface, said grip-ring second surface having a second taper angle, said grip-ring including a plurality of radially inward barbs, wherein upon tightening of said nut, said body end portion engages said nut recessed stop region, whereby said body end portion surface is disposed proximate said nut recessed stop surface, and said nut second surface abuts against and exerts an inwardly directed radial force on said grip-ring second surface that is directed in longitudinal and radial directions, whereby said grip-ring is urged both radially and longitudinally into said body and said grip-ring exerts an outwardly directed radial force on said projection, and wherein engagement of said body end portion and said nut recessed stop region and said abutment of said nut second surface and said grip ring second surface provides an inwardly directed substantially radial resistive force that reinforces said projection and said nut transition region.

2. The coupling of claim 1, wherein said body inner surface is tapered and diverges outwardly of said body, and said nut first surface is tapered and converges inwardly, wherein upon tightening of said nut, said body inner surface and said nut first surface abut against each other until in a fixed position whereby said body further reinforces said nut against outwardly directed radial force.

3. The coupling of claim 1, wherein said nut further includes an annular stop extending radially inwardly from the edge of said nut second surface, said stop being adapted to be abutted by said grip-ring when said grip-ring is in a compressed state to thereby provide a resistive force for said grip-ring moving longitudinally out of said body.

4. The coupling of claim 1, wherein said coupling is constructed of an acetal plastic material.

5. The coupling of claim 1, wherein said coupling is constructed of a polypropylene material.

* * * * *